US008407111B2

(12) United States Patent
Bernardy et al.

(10) Patent No.: US 8,407,111 B2
(45) Date of Patent: Mar. 26, 2013

(54) METHOD, SYSTEM AND COMPUTER PROGRAM PRODUCT FOR CORRELATING INFORMATION AND LOCATION

(75) Inventors: Thomas Bernardy, Nordrhein-Westfalen (DE); Stefan Pieper, Niedersachsen (DE)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 13/076,779

(22) Filed: Mar. 31, 2011

(65) Prior Publication Data

US 2012/0253996 A1 Oct. 4, 2012

(51) Int. Cl.
*G06Q 10/00* (2012.01)

(52) U.S. Cl. ........... 705/28; 705/8; 701/300; 348/231.3; 345/646; 235/385

(58) Field of Classification Search .................... 705/28, 705/8; 702/188–189; 701/29; 235/385; 345/646; 348/207
See application file for complete search history.

(56) References Cited

U.S. PATENT DOCUMENTS

| 6,233,536 | B1 * | 5/2001 | Zale et al. ..................... 702/188 |
| 7,141,321 | B2 * | 11/2006 | McArthur et al. ............ 429/443 |
| 7,698,030 | B2 * | 4/2010 | Martin .......................... 700/115 |
| 2002/0071038 | A1 * | 6/2002 | Mihelcic ....................... 348/207 |
| 2003/0011624 | A1 * | 1/2003 | Ellis .............................. 345/646 |
| 2003/0023466 | A1 * | 1/2003 | Harper ............................. 705/7 |
| 2004/0135821 | A1 | 7/2004 | Mazzeo |
| 2008/0049013 | A1 | 2/2008 | Nasle |
| 2009/0240603 | A1 * | 9/2009 | Stephenson et al. ............ 705/28 |

FOREIGN PATENT DOCUMENTS

| GB | 2353124 A | 2/2001 |
| GB | 2375643 A | 11/2002 |

* cited by examiner

*Primary Examiner* — Vanel Frenel

(74) *Attorney, Agent, or Firm* — David A. Cornett; Ernest G. Cusck; Frank A. Landgraff (57) ABSTRACT

In one aspect, embodiments of a method of correlating information and location comprise establishing a reference point for an entity. A three-dimensional coordinate is assigned to a device that comprises the entity. The assigned three-dimensional coordinate is relative to the reference point. Information about the device is correlated with the assigned three-dimensional coordinate and stored in a computing device. The computing device receives secondary information, and in response to the secondary information received by the computing device, the computing device provides at least one of the three-dimensional coordinate of the device or at least a portion of the information about the device.

41 Claims, 6 Drawing Sheets

METHOD, SYSTEM AND COMPUTER PROGRAM PRODUCT FOR CORRELATING INFORMATION AND LOCATION

FIELD OF THE INVENTION

Embodiments of the present invention are directed to methods, systems and computer program products for correlating information and location. Specifically, a three-dimensional coordinate is correlated with information about a device, system or component at or near the three-dimensional coordinate. The information or the three-dimensional coordinate can be retrieved and used in a number of ways. The device, system or component can be a part of a larger entity.

BACKGROUND OF THE INVENTION

In many instances, when maintaining a device, system or component that comprises a larger entity, a person may need information about the device, system or component. Generally, obtaining such information requires relying upon the technician's memory or researching records about the device, system or component. In many instances, these records may be poorly kept or non-existent. In addition, the person may have to leave the location of the device, system or component in order to perform the research, which reduces efficiency. Furthermore, even with computerized systems, the person is required to have some level of knowledge about the device, system or component in order to be able to research information about the same. Similarly, many entities that are comprised of devices, systems and components have automated monitoring and control systems. These automated monitoring and control systems may provide an error code when the device, system or component being monitored acts in an unusual manner. While the error code can be useful for providing information about the state of the entity, it may not provide sufficient information about the particular device, system or component that is acting unusual, or the specific location of the out of bounds device, system or component.

Therefore, what are desired are methods, systems and computer program products that overcome challenges in the art, some of which are described above.

BRIEF DESCRIPTION OF THE INVENTION

Described herein are embodiments of methods, systems or computer program products for correlating information and location.

Embodiments of methods of correlating information and location are described. In one aspect, an embodiment of a method of correlating information and location comprises establishing a reference point for an entity. A three-dimensional coordinate is assigned to a device that comprises the entity. The assigned three-dimensional coordinate is relative to the reference point. Information about the device is correlated with the assigned three-dimensional coordinate and stored in a computing device. The computing device receives secondary information, and in response to the secondary information received by the computing device, the computing device provides at least one of the three-dimensional coordinate of the device or at least a portion of the information about the device.

In another aspect, an embodiment of a method of correlating information and location comprises rendering, using a computer, a three-dimensional image of an entity. A reference point is established for the entity. One or more three-dimensional coordinates are assigned to one or more points of the three-dimensional image of the entity, wherein each of the one or more points corresponds to a device, system or part of the entity and the assigned one or more three-dimensional coordinates are relative to the reference point. The one or more three-dimensional coordinates are correlated with information about the respective point of the one or more points of the three-dimensional image of an entity and the point and its correlated information is stored in the computer. The computer receives secondary information and in response to the secondary information, provides at least one of the three-dimensional coordinates of the one or more three-dimensional coordinates assigned to the one or more points of the three-dimensional image of the entity or at least a portion of the information about at least one of the one or more points of the three-dimensional image of the entity.

In yet another aspect, embodiments of systems of correlating information and location are described. One embodiment comprises a memory and a processor operably connected with the memory. The processor is configured to render a three-dimensional image of an entity; assign one or more three-dimensional coordinates to one or more points of the three-dimensional image of the entity, wherein each of the one or more points corresponds to a device, system or part of the entity and the assigned one or more three-dimensional coordinates are relative to a reference point; store, in the memory, the one or more three-dimensional coordinates correlated with information about the respective point of the one or more points of the three-dimensional image of the entity; receive secondary information; and retrieve from the memory, in response to the received secondary information, at least one of the three-dimensional coordinates of the one or more three-dimensional coordinates assigned to the one or more points of the three-dimensional image of the entity or at least a portion of the information about at least one of the one or more points of the three-dimensional image of the entity.

In yet another aspect, embodiments of a computer program product of correlating location and information are described. One embodiment comprises computer-executable code sections stored on a non-transitory computer readable medium. The computer-executable code sections comprise a first section for rendering a three-dimensional image of an entity; a second section for assigning one or more three-dimensional coordinates to one or more points of the three-dimensional image of the entity, wherein each of the one or more points corresponds to a device, system or part of the entity and the assigned one or more three-dimensional coordinates are relative to a reference point; a third section for storing the one or more three-dimensional coordinates correlated with information about the respective point of the one or more points of the three-dimensional image of the entity; a fourth section for receiving secondary information; and a fifth section for providing, in response to the secondary information received by the computer, at least one of the three-dimensional coordinates of the one or more three-dimensional coordinates assigned to the one or more points of the three-dimensional image of the entity or at least a portion of the information about at least one of the one or more points of the three-dimensional image of the entity.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods, systems and computer program products.

Wherever possible, the same reference numbers will be used throughout the drawings to represent the same parts.

DETAILED DESCRIPTION OF THE INVENTION

Before the present methods, systems and computer program products are disclosed and described, it is to be understood that the methods, systems and computer program products are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, systems and computer program products. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
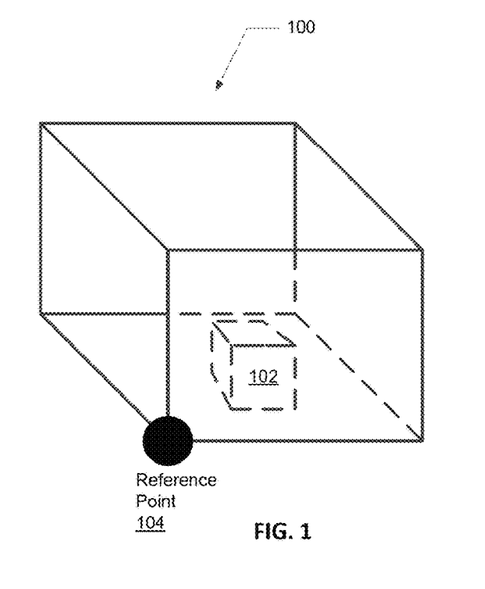
FIG. 1 is a perspective view of a rendering of an exemplary three-dimensional entity.

FIG. 1 is a perspective view of a rendering of an exemplary three-dimensional entity 100. In one aspect, the three-dimensional entity 100 can be rendered by a computer executing appropriate software such as, for example, three-dimensional computer-aided drafting (CAD) packages, three-dimensional laser scanners, and the like. Exemplary CAD packages include NX (Siemens Product Lifecycle Management Software, Inc., Plano, Tex.), Pro-Engineer (Parametric Technology Corporation, Needham, Mass.), CATIA (Dassault Systemes S. A. Vélizy-Villacoublay, France), and Inventor (AutoDesk, Inc., San Rafael, Calif.), among others. Exemplary three-dimension scanners include those available from 3DscanCo (a division of Laser Design, Inc., Atlanta, Ga.). Though shown as a simple cube-shaped entity in FIG. 1, it is to be appreciated that the three-dimensional entity 100 can be any entity of varying complexity including, for example, one or more buildings or houses, a warehouse, a factory, a power plant, a wind turbine generator, a steam turbine, a combustion turbine, an electric generator, a computer, a ship, a plane, an automobile, etc. The three-dimensional entity 100 can be comprised of one or more devices, parts, systems, sub-systems, components, sub-components, and the like (hereinafter, generally referred to as just a "device," but intended to encompass any one or more devices, parts, systems, sub-systems, components, sub-components, and the like of an entity). For example, as shown in FIG. 1, the three-dimensional entity 100 can be comprised of exemplary device, system or component 102. A reference point 104 can be established for the three-dimensional entity 100. In one aspect, the reference point 104 can be a three-dimensional coordinate. For example, the reference point 104 can be assigned a Cartesian three-dimensional coordinate of 0,0,0. Other three-dimensional coordinate systems, including cylindrical and spherical, can be used in embodiments of the present invention. It is to be appreciated that the reference point 104 can be established at any point, either on or in the entity 100, or separate from it. The coordinates assigned to the reference point 104 are arbitrary, as devices, parts, systems, sub-systems, components, sub-components, and the like can be assigned a three-dimensional coordinate relative to the reference point 104. For example, assuming the reference point 104 in FIG. 1 is assigned the Cartesian three-dimensional coordinate of 0,0,0, then the device 102 can be assigned a Cartesian center point coordinate of approximately 3,1,2. This assignment of three-dimensional coordinates can be performed for various devices, parts, systems, sub-systems, components, sub-components, and the like that comprise the entity 100. Furthermore, ranges of coordinates can be assigned to devices, parts, systems, sub-systems, components, sub-components, and the like that span multiple planes, or so that there does not have to be an exact match between devices, parts, systems, sub-systems, components, sub-components, and the like, and assigned coordinates. As noted herein, various three-dimensional coordinate systems can be used, including Cartesian, cylindrical and spherical. It is to be appreciated that all points that comprise the entity 100 can be assigned a three-dimensional coordinate that is relative to the reference point 104. Generally, the assignment of coordinates relative to the reference point to points that comprise the entity 100 is performed by software operating on a computing device.

Figure 2:
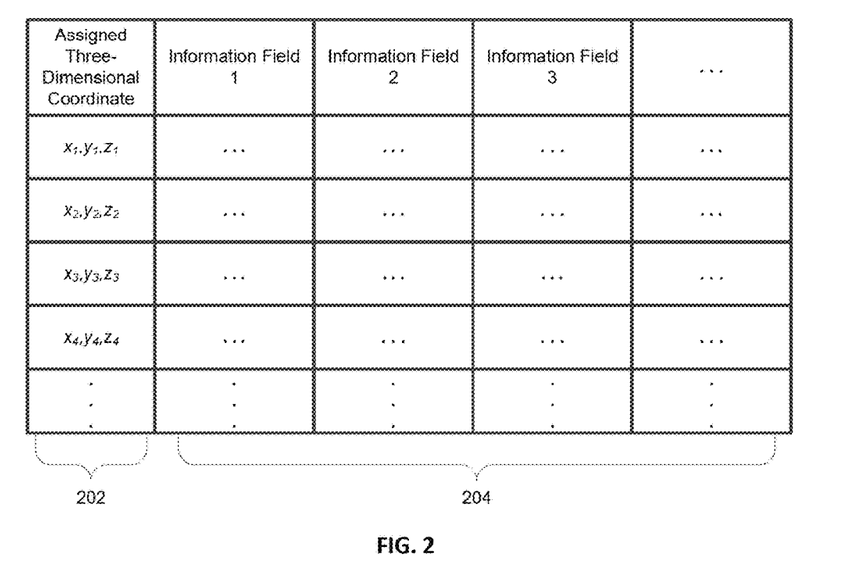
FIG. 2 illustrates an exemplary database structure that can be used for an entity to correlate an assigned three-dimensional coordinate with information about devices, parts, systems, sub-systems, components, sub-components, and the like located at or near the coordinate.

Information about devices, parts, systems, sub-systems, components, sub-components, and the like that have been assigned a three-dimensional coordinate relative to the reference point 104 can be stored in a database in a computer memory. In one aspect, the assigned three-dimensional coordinate can be correlated with information about devices, parts, systems, sub-systems, components, sub-components, and the like located at or near the coordinate. The assigned three-dimensional coordinate can be correlated with information about the devices, parts, systems, sub-systems, components, sub-components, and the like at or near the assigned three-dimensional coordinate including, for example, one or more of an identifier for the device, a date of installation of the device, a maintenance history of the device, a bill of materials that comprise the device, an age of the device, manufacturing information about the device, a maintenance schedule for the device, cost information about the device, replacement information about the device, inventory history for the device, use information about the device, in-service history of the device, material safety data sheet information for the device, predictive maintenance information about the device, planned replacement of the device, and operating instructions for the device. FIG. 2 illustrates an exemplary database structure that can be used for an entity to correlate an assigned three-dimensional coordinate 202 with information 204 about devices, parts, systems, sub-systems, components, sub-components, and the like located at or near the coordinate 202. In one aspect, the assigned three-dimensional coordinate 202 can be correlated with one or more other coordinate systems such as a coordinate system used by a global positioning system (GPS) by including the correlated other coordinate systems as information 204 in the database structure. Other information 204 that can be correlated with the assigned three-dimensional coordinate 202 includes, for example, one or more of an identifier for the device, a date of installation of the device, a maintenance history of the device, a bill of materials that comprise the device, an age of the device, manufacturing information about the device, a maintenance schedule for the device, cost information about the device, replacement information about the device, inventory history for the device, use information about the device, in-service history of the device, material safety data sheet information for the device, predictive maintenance information about the device, planned replacement of the device, operating instructions for the device, and the like. Therefore, using a database structure like or similar to the one shown in FIG. 2, information 204 about a device, part, system, sub-system, component, sub-component, and the like located at or near the assigned three-dimensional coordinate 202 can be obtained from the database by the computer receiving the assigned three-dimensional coordinate 202 (or approximately the assigned three-dimensional coordinate 202) and searching the database for a same or similar match, then retrieving the correlated information 204. Conversely, one or more aspects of the information 204 can be received by the computer and a search for information 204 that is the same or similar to the received information can be performed by the computer, thus retrieving database records that have a same or similar match to the received information.

Figure 3A:
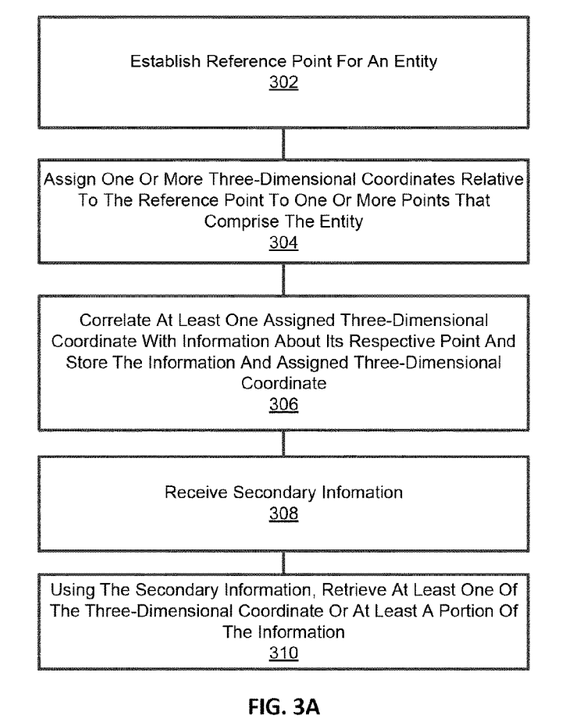
FIG. 3A is an flowchart of an embodiment of a computer implemented method for providing information about a device, part, system, sub-system, component, sub-component, and the like that comprise an entity.

Therefore, FIG. 3A is an flowchart of an embodiment of a computer implemented method for providing information about a device, part, system, sub-system, component, sub-component, and the like that comprise an entity. At step 302, a reference point is established for the entity. As step 304, a three-dimensional coordinate is assigned to one or more points that comprise the entity. In one aspect, the points assigned three-dimensional coordinates correspond to a device, part, system, sub-system, component, sub-component, and the like (hereinafter "device" is intended to include any device, part, system, sub-system, component, sub-component, and the like that comprises an entity or at least part of an entity). The three-dimensional coordinate is relative to the reference point. At step 306, at least one of the three-dimensional coordinates is stored in a computer and is correlated with information about its respective point. This information can include, for example, information about any device that is located at or near the assigned three-dimensional coordinate. The three-dimensional coordinate and its correlated information are stored in a database. At step 308, the computer receives secondary information. In one aspect, the secondary information comprises information that identifies one of the points that comprise the entity or the three-dimensional coordinate assigned to the point. In one aspect, the secondary information comprises information that identifies a device located at or near one or more of the points that comprise the entity, or the secondary information can identify the three-dimensional coordinate assigned to a device. In one aspect, the secondary information comprises an error code from a control or monitoring system that is used to control or monitor the device. The error code comprises sufficient information such that the error code can be used to identify a device causing the error code. In one aspect, in response to receiving the error code that can be used to identify the device, the computer provides the three-dimensional coordinate of the device. In one aspect, in response to providing the three-dimensional coordinate of the device, the computer displays the three-dimensional coordinate of the device on a rendering of the entity. In one aspect, the secondary information comprises location information for the device and the computer can receive the secondary information from a three-axle positioning device such as a global positioning system (GPS) receiver or light (including laser) and sound (including ultrasound) positioning devices. In one aspect, the positioning device is located at or approximately at the device, wherein the location information from the three-axle positioning device can be correlated with the assigned three-dimensional coordinate. In one aspect, in response to receiving the location information from the three-axle positioning device located approximately at the device, the computer provides information about the device. Such information can include, for example, one or more of an identifier for the device, a date of installation of the device, a maintenance history of the device, a bill of materials that comprise the device, an age of the device, manufacturing information about the device, a maintenance schedule for the device, cost information about the device, replacement information about the device, inventory history for the device, use information about the device, in-service history of the device, material safety data sheet information for the device, predictive maintenance information about the device, planned replacement of the device, operating instructions for the device, and the like. In one aspect, the three-axle positioning device comprises a GPS receiver and the GPS receiver can be contained within a portable tool that further comprises a transceiver. Therefore, the location information can be transmitted wirelessly to the computing device by the portable tool and the information about the device can be transmitted from the computer to the portable tool. In one aspect, the portable tool can comprise a wireless or cellular telephone, personal digital assistant (PDA), notebook or laptop computer, tablet computing device, and the like. At step 310, in response to receiving the secondary information, the computer retrieves at least one of the three-dimensional coordinate of the device or at least a portion of the information about the device. As noted herein, such information can include, for example, one or more of an identifier for the device, a date of installation of the device, a maintenance history of the device, a bill of materials that comprise the device, an age of the device, manufacturing information about the device, a maintenance schedule for the device, cost information about the device, replacement information about the device, inventory history for the device, use information about the device, in-service history of the device, material safety data sheet information for the device, predictive maintenance information about the device, planned replacement of the device, operating instructions for the device, and the like. In one aspect, the retrieved information can be displayed by the computing device on an associated display and/or transmitted to the portable tool where it can be displayed.

Figure 3B:
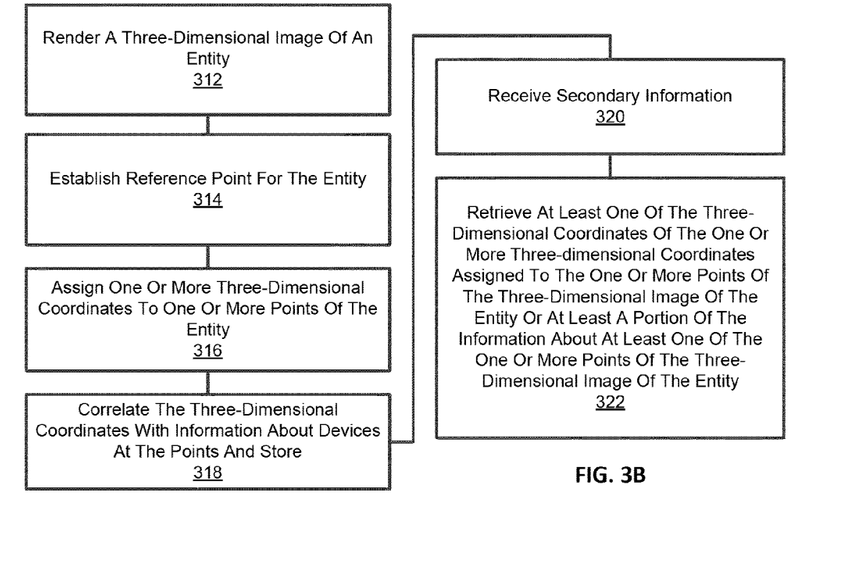
FIG. 3B is an flowchart of another embodiment of a computer implemented method for providing information about a device, part, system, sub-system, component, sub-component, and the like that comprise an entity.

FIG. 3B is an flowchart of another embodiment of a computer implemented method for providing information about a device, part, system, sub-system, component, sub-component, and the like that comprise an entity. At step 312, a three-dimensional image of an entity is rendered using a computer. At step 314, a reference point is established for the entity. At step 316, one or more three-dimensional coordinates are assigned to one or more points of the three-dimensional image of the entity, wherein each of the one or more points corresponds to a device, system or part of the entity and the assigned one or more three-dimensional coordinates are relative to the reference point. At step 318, the one or more three-dimensional coordinates correlated with information about the respective point of the one or more points of the three-dimensional image of an entity are stored in the computer. At step 320, secondary information is received by the computer. At step 322, in response to the secondary information received by the computer, the computer provides at least one of the three-dimensional coordinates of the one or more three-dimensional coordinates assigned to the one or more points of the three-dimensional image of the entity or at least a portion of the information about at least one of the one or more points of the three-dimensional image of the entity.

Figure 4:
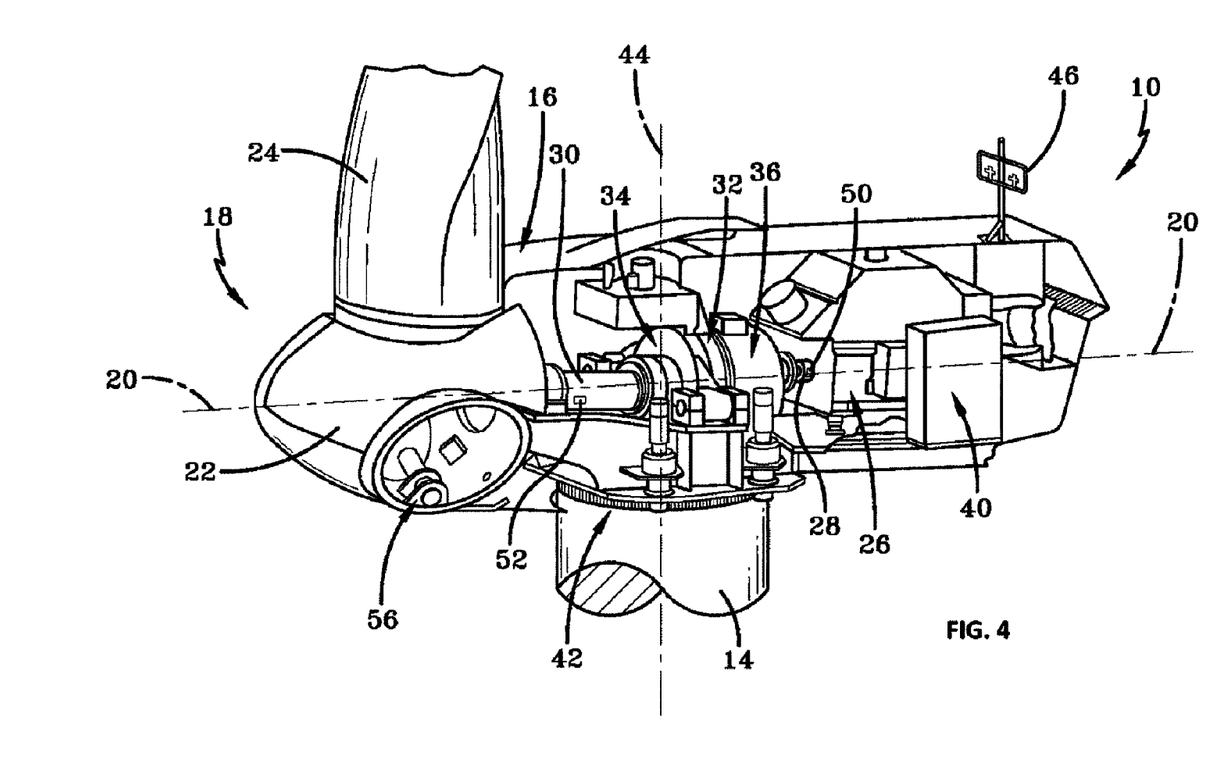
FIG. 4 is a partially cut-away perspective view of a portion of an exemplary embodiment of a wind turbine in accordance with the present disclosure.
Figure 5:
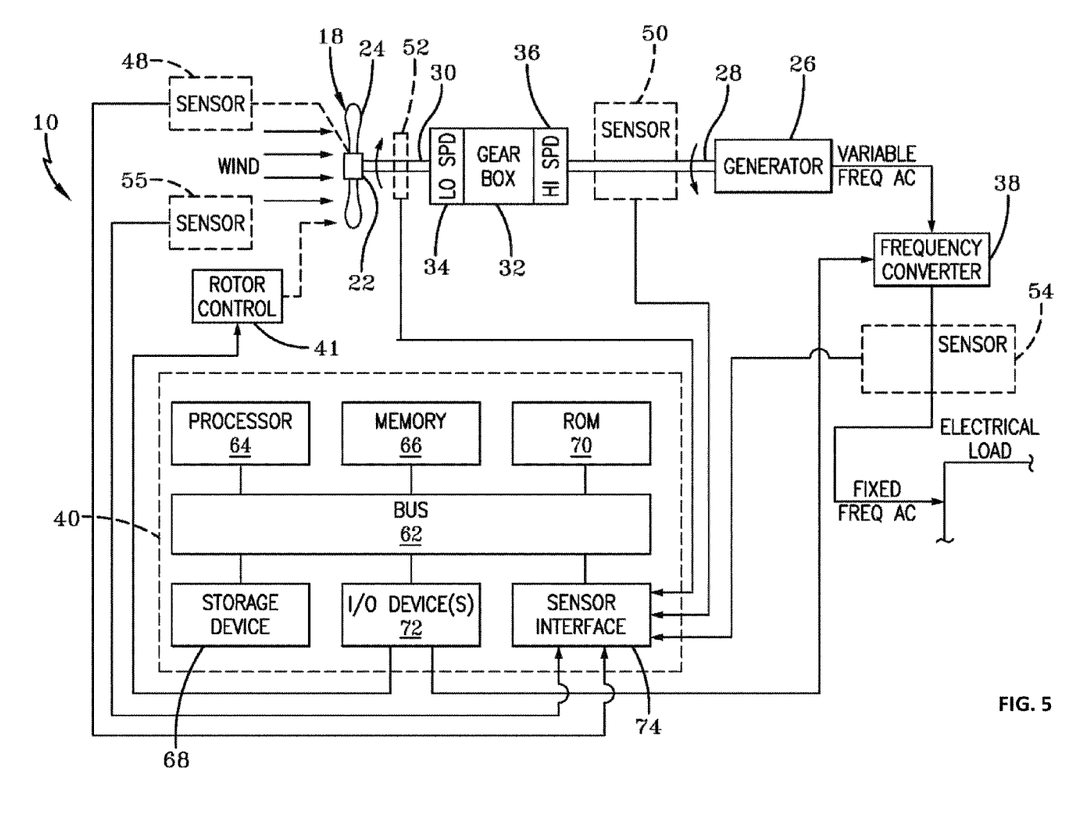
FIG. 5 is a schematic diagram of a wind turbine in accordance with the present disclosure.

FIG. 4 is an exemplary illustration of a three-dimensional partially cut-away perspective view rendering of a portion of an exemplary wind turbine 10 in accordance with an embodiment of the present disclosure. FIG. 5 is a schematic diagram of an exemplary wind turbine 10, including a control and monitoring system for the wind turbine 10. According to embodiments of the present disclosure, signals such as error codes from the control and monitoring system can be used to determine a three-dimensional coordinate for the device or system causing the error code, the location can then be indicated on a three-dimensional rendering of the turbine 10.

The exemplary wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, the exemplary wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 4-5, in some embodiments a plurality of wind turbines 10 may be grouped together, sometimes referred to as a "wind farm".

The exemplary wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof, which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 4, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a Darrieus wind turbine, sometimes referred to as an "eggbeater" turbine. Yet another example of a type, shape, and/or configuration of rotor blades 24 is a Savonious wind turbine. Even another example of another type, shape, and/or configuration of rotor blades 24 is a traditional windmill for pumping water, such as, but not limited to, four-bladed rotors having wooden shutters and/or fabric sails. Moreover, the exemplary wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 4 and 5, the exemplary wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Wind turbine rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine." In the exemplary embodiment, generator rotor shaft 28 is coupled to rotor shaft 28 through a gearbox 32, although in other embodiments the generator rotor shaft 28 can be coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

In one aspect, exemplary wind turbine 10 includes one or more control systems embodied in a turbine control unit (TCU) 40 coupled to some or all of the components of wind turbine 10 for generally controlling operation of wind turbine 10 and/or some or all of the components thereof (whether or not such components are described and/or illustrated herein), and in particular for controlling the tip speed of the blades 24 to control the noise generated by the blades 24. For example, in the exemplary embodiment, control system(s) are coupled to a rotor control 41 for generally controlling rotor 18. In the exemplary embodiment, the TCU 40 is mounted within nacelle 16. However, additionally or alternatively, one or more control systems 40 may be remote from nacelle 16 and/or other components of wind turbine 10. In one aspect, the TCU 40 may be used for, but is not limited to, power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing a direction faced by rotor 18 to, for example, adjust an angle between the direction faced by rotor 18 and a direction of wind. In one aspect, the yaw system 42 may be coupled to the TCU 40 for control thereby. In some embodiments, wind turbine 10 may include anemometry 46 for measuring wind speed and/or wind direction. Anemometry 46, in some embodiments, may be coupled to the TCU 40 for sending measurements to control system(s) for processing thereof. For example, although anemometry 46 may be coupled to the TCU 40 for sending measurements thereto for controlling other operations of wind turbine 10, anemometry 46 may send measurements to the TCU 40 for controlling and/or changing a yaw of rotor 18 using yaw system 42. Alternatively, anemometry 46 may be coupled directly to yaw system 42 for controlling and/or changing a yaw of rotor 18.

In one aspect, the exemplary wind turbine 10 may also include a plurality of sensors 48 (FIG. 5), each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to the TCU 40 for sending pitch measurements to control system(s) for processing thereof.

Wind turbine 10 may also include one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof.

Wind turbines 10 may also include one or more sensors 52 coupled to rotor shaft 30 for measuring a speed of rotation of generator shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof.

Wind turbines 10 may also include one or more sensors 54 (FIG. 5) coupled to generator 26 for measuring an electrical power output of generator 26. In some embodiments, sensor(s) 54 are coupled to the TCU 40 for sending measurements to control system(s) for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbines 10 may also include one or more sensors 55 (FIG. 5) coupled to the TCU 40 for sending measurements to control system(s) for processing thereof. Sensors 55 may be any suitable sensor having any suitable location within or remote to wind turbine 10, such as, but not limited to, anemometers.

Wind turbine 10 may also include one or more other sensors (not shown) coupled to one or more components of wind turbine 10 and/or the electrical load, whether or not such component(s) are described or illustrated herein, for measuring parameters of such component(s). Such other sensor(s) may include, but are not limited to, sensors configured to measure displacements, yaw, pitch, movements, strain, stress, twist, damage, failure, rotor torque, rotor speed, an anomaly in the electrical load, an anomaly in temperature, and/or an anomaly of power supplied to any component of wind turbine 10. Such other sensors may couple to any component of wind turbine 10 and/or the electrical load at any location thereof for measuring any parameter thereof, whether or not such component, location, and/or parameter is described and/or illustrated herein.

In one aspect, the wind turbine 10 can include a variable blade pitch system 56 for controlling, including but not limited to changing, a pitch angle of rotor blades 24 (shown in FIGS. 4-5) in response to a condition such as wind speed.

Referring again to FIG. 5, in some embodiments, the TCU 40 can include a bus 62 or other communications device to communicate information. One or more processor(s) 64 can be coupled to bus 62 to process information, including information from anemometry 46, sensors 48, 50, 52, 54 and/or 55, and/or other sensor(s). The TCU 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. The TCU 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) and/or to provide outputs, such as, but not limited to, yaw control and/or pitch control outputs. Furthermore, in one aspect the TCU 40 interfaces with a supervisory control and data acquisition (SCADA) system (not shown) through the input/output device 72. The SCADA system can be used to collect and monitor data from the wind turbine 10 as well as to provide control commands to the TCU 40. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. In one aspect, the TCU 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

The SCADA system can include a Human-Machine Interface (HMI), a supervisory (computer) system, Remote Terminal Units (RTUs), and a communication infrastructure. The HMI is an apparatus that presents performance-related information to the operator. By using the HMI, the operator can monitor and/or control operation of wind turbine(s) 10 and/or wind farm(s). In one aspect, the HMI includes a graphical user interface (GUI), that allows the operator to interface with the wind farm in a graphical manner. The supervisory system monitors wind turbine(s) 10 and/or wind farm(s) by gathering and/or acquiring information (in the form of data). Also, the supervisory system controls wind turbine(s) 10 and/or wind farm(s) by transmitting commands to wind turbine(s) 10 and/or wind farm(s). The RTUs receive signals from anemometry 46, sensors 48, 50, 52, 54 and/or 55, and/or other sensor(s), convert the signals into digital data, and transmit the digital data to the supervisory system via the communication infrastructure (for example, optical fibers). In one aspect, the TCU 40 comprises an RTU. In one aspect, in addition to the wind turbines 10, the wind farm comprises one or more substation and meteorological stations, each having separate RTUs.

The SCADA system acts as a "nerve center" for wind turbine(s) 10 and/or wind farm(s). The SCADA system continuously analyzes the performance-related information and transmits signals to the GUI so that the performance-related information is visually depicted in a dynamic manner. The SCADA system can monitor and/or control wind turbine(s) 10 and wind farm(s), one or more substations (not shown), and one or more meteorological stations (not shown) thus allowing the operator to cohesively monitor and/or control wind turbine(s) 10 at a specific location, a wind farm, or any other suitable grouping of wind turbines 10. The SCADA system stores periodic records throughout a given period of time. The periodic records can be based upon activity at the specific location, the wind farm, or any other suitable grouping of wind turbines 10. The periodic records can be analyzed to provide the operator with performance-related information. The performance-related information can be used for implementing corrective action. The SCADA system implements requirements based upon connection agreements to control reactive power production, to contribute to network voltage or frequency control, or to limit power output in response to instructions from a network operator.

The SCADA system can provide basic and dynamic displays 80 for the operator. The basic displays include intuitive tools for operation and maintenance of wind turbine(s) 10 and/or wind farm(s). For example, the basic display may include production reports regarding wind turbine monitoring and control, a visual representation identifying the mode of wind turbine(s) 10 and/or wind farm(s), wind farm power and/or wind speed as a recent time plot of wind speed and generated power, and/or a visual representation identifying the status of wind turbine(s) 10 and/or wind farm(s) superimposed on a detailed geographical map. For example, the detailed geographical map can include a three-dimensional rendering of all or parts of the wind farm. The basic displays may be available through specific applications. For example, a viewer application may provide information relating to operation and maintenance of wind turbine(s) 10 and/or wind farms(s). The viewer application may be available on-site or remotely. The remote access to the viewer application may be through an Internet connection, a telephone line, a satellite signal, a radio signal, or any other suitable communication method. The communication method may be secure by any suitable measure(s). Suitable measure(s) may be encryption of any signal (for example, 40 bit encryption, 128 bit encryption, 256 bit encryption, etc.), recording all executed activity as an audit trail, limiting access to predetermined applications and/or functions of the SCADA system, or other suitable measures.

As noted above, in one aspect the TCU 40 can operate in conjunction with a supervisory control and data acquisition (SCADA) system to dynamically monitor and control wind turbine(s) 10 or wind farm(s). In one aspect, a computer can be used to render a three-dimensional image of an entity such as the wind farm described herein. A reference point can be established for the wind farm. Systems, devices, components, and various points that comprise the wind farm can be assigned one or more three-dimensional coordinates to one or more points of the three-dimensional image of the entity, wherein each of the one or more points corresponds to a device, system or part of the wind farm, and the assigned one or more three-dimensional coordinates are relative to the reference point. The one or more three-dimensional coordinates can be correlated with information about the respective point of the one or more points of the three-dimensional image of the wind farm. For example, the one or more three-dimensional coordinates can be correlated with the information about the at least one of the one or more points of the three-dimensional image of the wind farm including one or more of an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, operating instructions, and the like for the device, system or part of the entity corresponding to the at least one of the one or more points of the three-dimensional image of the wind farm. In one aspect, the computer can receive secondary information and in response to receiving the secondary information, the computer can provide at least one of the three-dimensional coordinates of the one or more three-dimensional coordinates assigned to the one or more points of the three-dimensional image of the wind farm or at least a portion of the information about at least one of the one or more points of the three-dimensional image of the wind farm.

Figure 6:
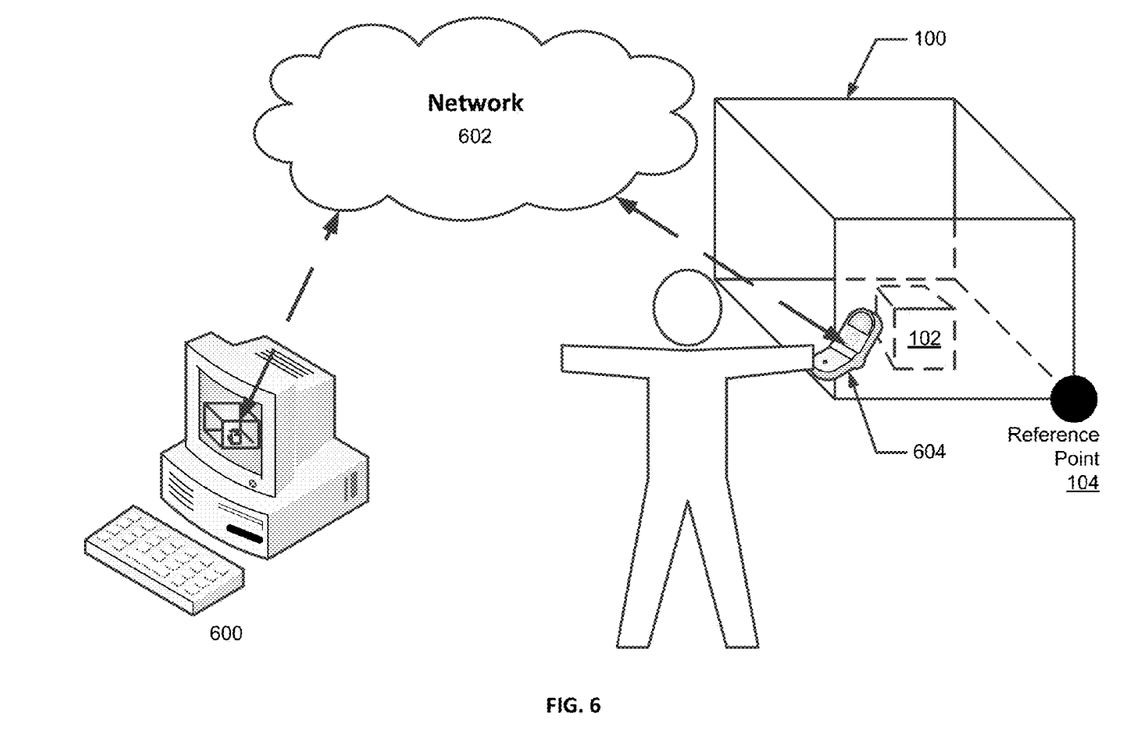
FIG. 6 illustrates an exemplary system that can be used to practice embodiments of the present invention.

FIG. 6 illustrates an exemplary system that can be used to practice embodiments of the present invention. As shown in FIG. 6, the embodiment of a system is comprised of a computing device 600 that is further comprised of at least a processor and a memory. In one aspect, the computing device may also comprise a display and a network interface that allows the computing device to receive and/or send information over a network 602. The network 602 can be wired (including fiber optic), wireless, or a combination of wired and wireless using protocols as are known to one of ordinary skill in the art. In one aspect, the processor and the memory of the computing device 600 are operably connected and the processor is configured to render a three-dimensional image of an entity 100. In one aspect, the three-dimensional rendering can be displayed on the display of the computing device. The processor is further configured to assign one or more three-dimensional coordinates to one or more points of the three-dimensional image of the entity 100. Each of the one or more points corresponds to a device, system or part 102 of the entity 100, and the assigned one or more three-dimensional coordinates are relative to a reference point 104. The processor is configured to store, in the memory, the one or more three-dimensional coordinates correlated with information about the respective point of the one or more points of the three-dimensional image of the entity 100. For example, a three-dimensional coordinate can be correlated with information about a device 102 at or near the three-dimensional coordinate including, for example, one or more of an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, operating instructions, and the like for the device, system or part 102 of the entity 100. The processor can be configured to receive secondary information, and in response to receiving the secondary information the processor can retrieve from the memory at least one of the three-dimensional coordinates of the one or more three-dimensional coordinates assigned to the one or more points of the three-dimensional image of the entity 100 or at least a portion of the information about at least one of the one or more points of the three-dimensional image of the entity 100. In one aspect, the secondary information comprises information that identifies at least one of the one or more points of the three-dimensional image of the entity or at least one of the one or more three-dimensional coordinates assigned to the one or more points of the three-dimensional image of the entity. In one aspect, the secondary information comprises an error code from a control or monitoring system used to control or monitor the entity 100. The error code can be used to identify at least one of the one or more three-dimensional coordinates assigned to the one or more points of the three-dimensional image of the entity 100. In one aspect, the control and monitoring system can be integrated with the computing device 100. The error code can be used to identify at least one of the one or more three-dimensional coordinates assigned to the one or more points of the three-dimensional image of the entity 100. In one aspect, in response to receiving the error code, the processor can be configured to provide the respective three-dimensional coordinate of each of the at least one of the one or more points of the three-dimensional image of the entity 100. In one aspect, the processor is configured to display the respective three-dimensional coordinate of each of the at least one of the one or more points of the three-dimensional image of the entity 100 on the three-dimensional rendering of the entity on the display of the computing device 600.

Though shown as a three-dimensional cubes in FIG. 6, it is to be appreciated that the entity 100 and device 102 can be anything capable of being rendered in three-dimensions including, for example, buildings, towns, cities, a power plant, a wind turbine generator, a steam turbine, a combustion turbine, a generator, trains, autos, airplanes, internal combustion engines, etc. and any devices, systems, components, sub-components and the like that comprise the entity. In one aspect, the system further comprises a three-axle positioning device 604 such as, for example, a global positioning system (GPS) receiver or light (including laser) and sound (including ultrasound) positioning devices. In one aspect, the processor of the computing device 600 is configured to receive location information for at least one of the one or more points of the three-dimensional image of the entity 100 from the three-axle positioning device 604 located approximately at the at least one of the one or more points of the three-dimensional image of the entity 100. In one aspect, the location information is transmitted from the three-axle positioning device 604 to the computing device via the network 602. In another aspect, the three-axle positioning device 604 can store the location information which can then be transferred to the computing device using, for example, a physical connection such as a USB cable or by transferring media (e.g., memory card) from the device 604 to the computing device 600. In one embodiment, the computing device 600 and the three-axle positioning device 604 are the same apparatus such as a portable or laptop computer, a tablet computing device, and the like. In other aspects, the three-axle positioning device 604 and the computing device 600 are separate apparatus. In one aspect, the three-axle positioning device 604 can be a cellular telephone or a PDA that includes a GPS receiver. In other aspects, the three-axle positioning device 604 can be any portable tool that includes a mechanism that can determine a spatial location of the portable tool. In one aspect, the location information from the three-axle positioning device 604 is correlated with the respective three-dimensional coordinate of each of the at least one of the one or more points of the three-dimensional image of the entity 100. In one aspect, in response to receiving the location information from the three-axle positioning device 604 located approximately at or near the at least one of the one or more points of the three-dimensional image of the entity 100, the processor is configured to provide information about the at least one of the one or more points of the three-dimensional image of the entity 100. As noted herein, the information about the at least one of the one or more points of the three-dimensional image of the entity 100 can include, for example, an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, operating instructions, and the like for the device 102 corresponding to the at least one of the one or more points of the three-dimensional image of the entity 100.

The technical effect of embodiments of the described invention is to correlate information with location. In particular, information about a device, system or component that comprises a larger entity can be correlated with a three-dimensional coordinate at or near the device, system or component. Such information and the correlated three-dimensional coordinate can be stored in a memory and retrieved and used in various ways.

Figure 7:
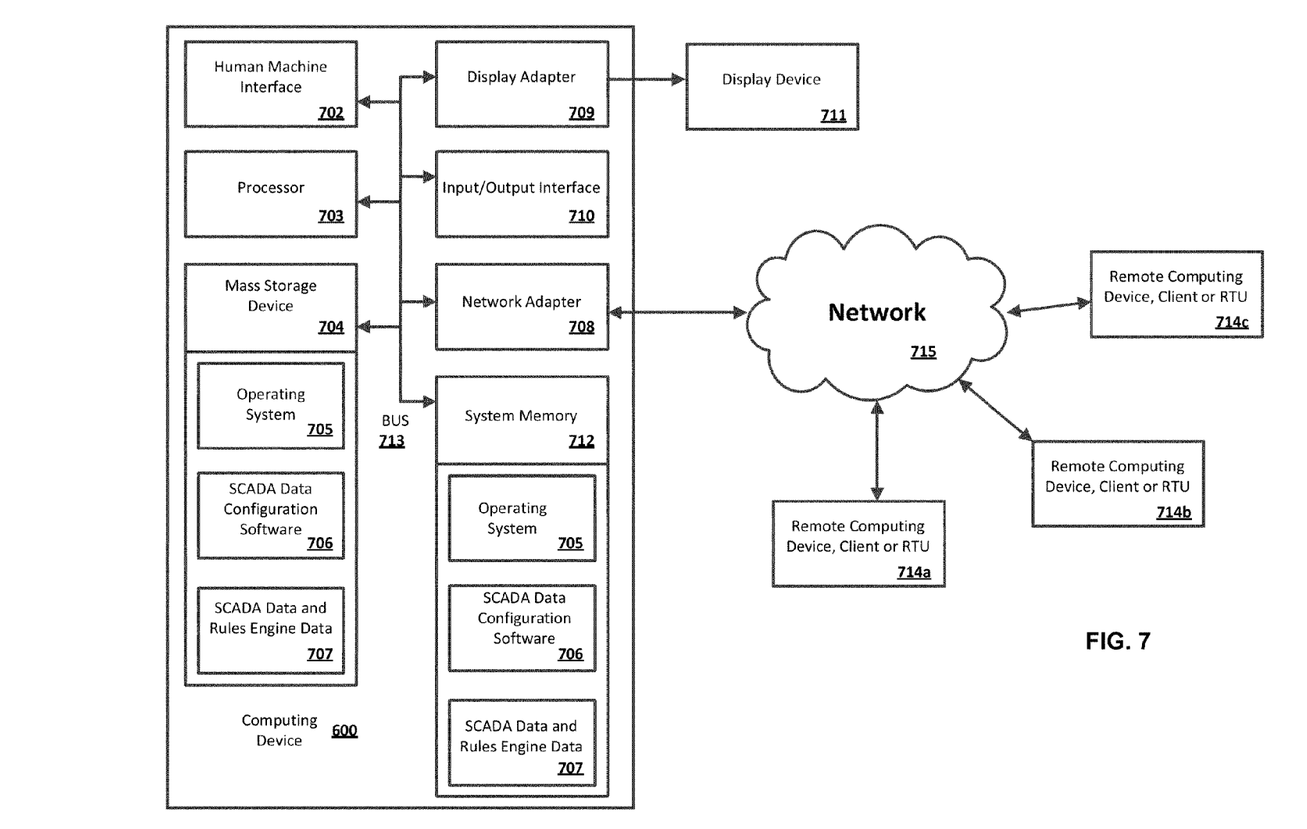
FIG. 7 is a block diagram illustrating an exemplary operating environment for performing the disclosed methods.

FIG. 7 is a block diagram illustrating an exemplary operating environment for performing the disclosed methods. FIG. 7 also illustrates an exemplary computing device 600 that can be used in accordance with embodiments of the present invention. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, tablet devices, and multi-processor systems. Additional examples comprise set top boxes, programmable consumer electronics, network PCs, minicomputers, mainframe computers, remote terminal units, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 600. The components of the computing device 600 can comprise, but are not limited to, one or more processors or processing units 703, a system memory 712, and a system bus 713 that couples various system components including the processor 703 to the system memory 712. In the case of multiple processing units 703, the system can utilize parallel computing. In one aspect, the one or more processors or processing units 703 can be configured to render a three-dimensional image of an entity and assign one or more three-dimensional coordinates to one or more points of the three-dimensional image of the entity. Each of the one or more points corresponds to a device, system or part of the entity and the assigned one or more three-dimensional coordinates are relative to a reference point. The processor 703 can be configured to store, in the memory 712, the one or more three-dimensional coordinates correlated with information about the respective point of the one or more points of the three-dimensional image of the entity. The processor 703 can be configured to receive secondary information, and retrieve from the memory 712, in response to the received secondary information, at least one of the three-dimensional coordinates of the one or more three-dimensional coordinates assigned to the one or more points of the three-dimensional image of the entity or at least a portion of the information about at least one of the one or more points of the three-dimensional image of the entity.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, three-dimensional configuration and correlation software 706, three-dimensional coordinate data 707, a network adapter 708, system memory 712, an Input/Output Interface 710, a display adapter 709, a display device 711, and a human machine interface 702, can be contained within one or more remote computing devices, clients or remote terminal units (RTUs) 714*a,b,c* at physically separate locations, connected through buses of this form, in effect implementing a fully distributed system or distributed architecture.

The computing device 600 typically comprises a variety of computer readable media. Exemplary readable media can be any available media that is non-transitory and accessible by the computing device 600 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as three-dimensional coordinate data 707 and/or program modules such as operating system 705 and three-dimensional configuration and correlation software 706 that are immediately accessible to and/or are presently operated on by the processing unit 703.

In another aspect, the computing device 600 can also comprise other non-transitory, removable/non-removable, volatile/non-volatile computer storage media. By way of example, FIG. 7 illustrates a mass storage device 704 that can provide non-volatile storage of computer code, computer readable instructions, data structures, program modules, and other data for the computing device 600. For example, and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and three-dimensional configuration and correlation software 706. Each of the operating system 705 and three-dimensional configuration and correlation software 706 (or some combination thereof) can comprise elements of the programming and the three-dimensional configuration and correlation software 706. Three-dimensional coordinate data 707 can also be stored on the mass storage device 704. Three-dimensional coordinate data 707 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 600 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 600 can have more than one display adapter 709 and the computing device 600 can have more than one display device 711. For example, a display device can be a monitor, an LCD (Liquid Crystal Display), or a projector. In addition to the display device 711, other output peripheral devices can comprise components such as speakers (not shown) and a printer (not shown), which can be connected to the computing device 600 via Input/Output Interface 710. Any step and/or result of the methods can be output in any form to an output device. Such output can be any form of visual representation, including, but not limited to, textual, graphical, animation, audio, tactile, and the like.

The computing device 600 can operate in a networked environment using logical connections to one or more remote computing devices, clients or RTUs 714a,b,c. By way of example, a remote computing device 714 can be a personal computer, portable computer, a server, a router, a network computer, a smart meter, a vendor or manufacture's computing device, smart grid components, a peer device, a smart phone, an RTU, or other common network node, and so on. Logical connections between the computing device 600 and a remote computing device, client or RTU 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and other networks 715.

For purposes of illustration, application programs and other executable program components such as the operating system 705 are illustrated herein as discrete blocks, although it is recognized that such programs and components reside at various times in different storage components of the computing device 600, and are executed by the data processor(s) of the computer. An implementation of three-dimensional configuration and correlation software 706 can be stored on or transmitted across some form of computer readable media.

Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices. For example, the computer program product may take the form of computer-executable code sections stored on an appropriate computer-readable medium. In one aspect, the computer-executable code sections comprise a first section for rendering a three-dimensional image of an entity; a second section for assigning one or more three-dimensional coordinates to one or more points of the three-dimensional image of the entity, wherein each of the one or more points corresponds to a device, system or part of the entity and the assigned one or more three-dimensional coordinates are relative to a reference point; a third section for storing the one or more three-dimensional coordinates correlated with information about the respective point of the one or more points of the three-dimensional image of the entity; a fourth section for receiving secondary information; and a fifth section for providing, in response to the secondary information received by the computer, at least one of the three-dimensional coordinates of the one or more three-dimensional coordinates assigned to the one or more points of the three-dimensional image of the entity or at least a portion of the information about at least one of the one or more points of the three-dimensional image of the entity.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 703 discussed above with reference to FIG. 7, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 703 of FIG. 7) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:

establishing a reference point;

assigning a three-dimensional coordinate to a device, wherein the three-dimensional coordinate is relative to the reference point;

storing, in a computing device, the three-dimensional coordinate correlated with information about the device;

receiving, by the computing device, secondary information; and providing, by the computing device, in response to the secondary information received by the computing device, at least one of the three-dimensional coordinate of the device or at least a portion of the information about the device.

2. The method of claim 1, wherein receiving, by the computing device, secondary information comprises receiving, by the computing device, secondary information that identifies the device or the three-dimensional coordinate assigned to the device.

3. The method of claim 1, wherein receiving, by the computing device, secondary information comprises receiving, by the computing device, an error code from a control or monitoring system, wherein the error code can be used to identify the device.

4. The method of claim 3, wherein in response to receiving the error code, the computing device provides the three-dimensional coordinate of the device.

5. The method of claim 4, wherein the device comprises a part of a system, and the computing device displays the three-dimensional coordinate of the device on a rendering of the system.

6. The method of claim 1, wherein the device comprises part of a system comprised of components, and the method further comprises developing a three-dimensional model of the system and assigning three-dimensional coordinates to one or more points in the system, each point corresponding to one of the components that comprise the system.

7. The method of claim 6, wherein the system comprises one or more of a wind turbine generator, a steam turbine and generator, and a combustion turbine and generator.

8. The method of claim 1, wherein receiving, by the computing device, secondary information comprises receiving, by the computer, location information for the device from a global positioning system (GPS) receiver located approximately at the device, wherein the location information is correlated with the three-dimensional coordinate.

9. The method of claim 8, wherein in response to receiving the location information from the GPS receiver located approximately at the device, the computing device provides information about the device.

10. The method of claim 9, wherein the information about the device includes one or more of an identifier for the device, a date of installation of the device, a maintenance history of the device, a bill of materials that comprise the device, an age of the device, manufacturing information about the device, a maintenance schedule for the device, cost information about the device, replacement information about the device, inventory history for the device, use information about the device, in-service history of the device, material safety data sheet information for the device, predictive maintenance information about the device, planned replacement of the device, and operating instructions for the device.

11. The method of claim 9, wherein the GPS receiver is contained within a portable tool that further comprises a transceiver, and the location information is transmitted wirelessly to the computing device by the portable tool.

12. The method of claim 11, wherein the information about the device is transmitted from the computing device to the portable tool.

13. The method of claim 12, wherein the portable tool is a cellular telephone.

14. The method of claim 1, wherein storing, in the computing device, the three-dimensional coordinate correlated with information about the device comprises storing the three-dimensional coordinate correlated with one or more of an identifier for the device, a date of installation of the device, a maintenance history of the device, a bill of materials that comprise the device, an age of the device, manufacturing information about the device, a maintenance schedule for the device, cost information about the device, replacement information about the device, inventory history for the device, use information about the device, in-service history of the device, material safety data sheet information for the device, predictive maintenance information about the device, planned replacement of the device, and operating instructions for the device.

15. A computer-implemented method comprising:
   rendering, using a computer, a three-dimensional image of an entity;
   establishing a reference point for the entity;
   assigning one or more three-dimensional coordinates to one or more points of the three-dimensional image of the entity, wherein each of the one or more points corresponds to a device, system or part of the entity and the assigned one or more three-dimensional coordinates are relative to the reference point;
   storing, in the computer, the one or more three-dimensional coordinates correlated with information about the respective point of the one or more points of the three-dimensional image of an entity;
   receiving, by the computer, secondary information; and
   providing, by the computer, in response to the secondary information received by the computer, at least one of the three-dimensional coordinates of the one or more three-dimensional coordinates assigned to the one or more points of the three-dimensional image of the entity or at least a portion of the information about at least one of the one or more points of the three-dimensional image of the entity.

16. The method of claim 15, wherein receiving, by the computer, secondary information comprises receiving, by the computer, secondary information that identifies at least one of the one or more points of the three-dimensional image of the entity or at least one of the one or more three-dimensional coordinates assigned to the one or more points of the three-dimensional image of the entity.

17. The method of claim 15, wherein receiving, by the computer, secondary information comprises receiving, by the computer, an error code from a control or monitoring system, wherein the error code can be used to identify at least one of the one or more three-dimensional coordinates assigned to the one or more points of the three-dimensional image of the entity.

18. The method of claim 17, wherein in response to receiving the error code that can be used to identify at least one of the one or more points of the three-dimensional image of the entity, the computer provides the respective three-dimensional coordinate of each of the at least one of the one or more points of the three-dimensional image of the entity.

19. The method of claim 18, wherein the computer displays the respective three-dimensional coordinate of each of the at least one of the one or more points of the three-dimensional image of the entity on the three-dimensional rendering of the entity.

20. The method of claim 15, wherein the entity comprises one or more of a power plant, a wind turbine generator, a steam turbine, a combustion turbine, and a generator.

21. The method of claim 15, wherein receiving, by the computer, secondary information comprises receiving, by the computer, location information for at least one of the one or more points of the three-dimensional image of the entity from a global positioning system (GPS) receiver located approximately at the at least one of the one or more points of the three-dimensional image of the entity, wherein the location information is correlated with the respective three-dimensional coordinate of each of the at least one of the one or more points of the three-dimensional image of the entity.

22. The method of claim 21, wherein in response to receiving the location information from the GPS receiver located approximately at the at least one of the one or more points of the three-dimensional image of the entity, the computer provides information about the at least one of the one or more points of the three-dimensional image of the entity.

23. The method of claim 22, wherein the information about the at least one of the one or more points of the three-dimensional image of the entity includes one or more of an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, and operating instructions for the device, system or part of the entity corresponding to the at least one of the one or more points of the three-dimensional image of the entity.

24. The method of claim 22, wherein the GPS receiver is contained within a portable tool that further comprises a transceiver, and the location information is transmitted wirelessly to the computer by the portable tool.

25. The method of claim 24, wherein the information about the at least one of the one or more points of the three-dimensional image of the entity is transmitted from the computer to the portable tool.

26. The method of claim 25, wherein the portable tool is a cellular telephone.

27. The method of claim 15, wherein storing, in the computer, the one or more three-dimensional coordinates correlated with information about the respective point of the one or more points of the three-dimensional image of an entity comprises storing the three-dimensional coordinate correlated with one or more of an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, and operating instructions for the device, system or part of the entity corresponding to the at least one of the one or more points of the three-dimensional image of the entity.

28. A system comprised of:
a memory; and
a processor operably connected with the memory, wherein the processor is configured to:
  render a three-dimensional image of an entity;
  assigning one or more three-dimensional coordinates to one or more points of the three-dimensional image of the entity, wherein each of the one or more points corresponds to a device, system or part of the entity and the assigned one or more three-dimensional coordinates are relative to a reference point;
  store, in the memory, the one or more three-dimensional coordinates correlated with information about the respective point of the one or more points of the three-dimensional image of the entity;
  receive secondary information; and
  retrieve from the memory, in response to the received secondary information, at least one of the three-dimensional coordinates of the one or more three-dimensional coordinates assigned to the one or more points of the three-dimensional image of the entity or at least a portion of the information about at least one of the one or more points of the three-dimensional image of the entity.

29. The system of claim 28, wherein the secondary information comprises information that identifies at least one of the one or more points of the three-dimensional image of the entity or at least one of the one or more three-dimensional coordinates assigned to the one or more points of the three-dimensional image of the entity.

30. The system of claim 28, wherein the secondary information comprises an error code from a control or monitoring system, wherein the error code can be used to identify at least one of the one or more three-dimensional coordinates assigned to the one or more points of the three-dimensional image of the entity.

31. The system of claim 30, wherein in response to receiving the error code that can be used to identify at least one of the one or more points of the three-dimensional image of the entity, the processor is configured to provide the respective three-dimensional coordinate of each of the at least one of the one or more points of the three-dimensional image of the entity.

32. The system of claim 31, wherein the system further comprises a display and the processor is configured to display the respective three-dimensional coordinate of each of the at least one of the one or more points of the three-dimensional image of the entity on the three-dimensional rendering of the entity.

33. The system of claim 28, wherein the entity comprises one or more of a power plant, a wind turbine generator, a steam turbine, a combustion turbine, and a generator.

34. The system of claim 28, further comprising a global positioning system (GPS) receiver, wherein the processor is configured to receive location information for at least one of the one or more points of the three-dimensional image of the entity from the receiver located approximately at the at least one of the one or more points of the three-dimensional image of the entity, wherein the location information is correlated with the respective three-dimensional coordinate of each of the at least one of the one or more points of the three-dimensional image of the entity.

35. The system of claim 34, wherein in response to receiving the location information from the GPS receiver located approximately at the at least one of the one or more points of the three-dimensional image of the entity, the processor is configured to provide information about the at least one of the one or more points of the three-dimensional image of the entity.

36. The system of claim 35, wherein the information about the at least one of the one or more points of the three-dimensional image of the entity includes one or more of an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, and operating instructions for the device, system or part of the entity corresponding to the at least one of the one or more points of the three-dimensional image of the entity.

37. The system of claim 28, wherein the GPS receiver is contained within a portable tool that further comprises a transceiver, and the location information is transmitted wirelessly to the processor by the portable tool.

38. The system of claim 37, wherein the information about the at least one of the one or more points of the three-dimensional image of the entity is retrieved from the memory by the processor and transmitted to the portable tool.

39. The system of claim 37, wherein the portable tool is a cellular telephone.

40. The system of claim 28, wherein the processor is configured to store in the memory the three-dimensional coordinate correlated with one or more of an identifier, a date of installation, a maintenance history, a bill of materials, an age, manufacturing information, a maintenance schedule, cost information, replacement information, inventory history, use information, in-service history, material safety data sheet information, predictive maintenance information, planned replacement information, and operating instructions for the device, system or part of the entity corresponding to the at least one of the one or more points of the three-dimensional image of the entity.

41. A computer program product comprised of computer-executable code sections on a non-transitory computer-readable medium, said computer-executable code sections comprising:
  a first section for rendering a three-dimensional image of an entity;
  a second section for assigning one or more three-dimensional coordinates to one or more points of the three-dimensional image of the entity, wherein each of the one or more points corresponds to a device, system or part of the entity and the assigned one or more three-dimensional coordinates are relative to a reference point;
  a third section for storing the one or more three-dimensional coordinates correlated with information about the respective point of the one or more points of the three-dimensional image of the entity;
  a fourth section for receiving secondary information; and
  a fifth section for providing, in response to the secondary information received by the computer, at least one of the three-dimensional coordinates of the one or more three-dimensional coordinates assigned to the one or more points of the three-dimensional image of the entity or at least a portion of the information about at least one of the one or more points of the three-dimensional image of the entity.

* * * * *